United States Patent
Fengyi

(10) Patent No.: US 9,463,928 B2
(45) Date of Patent: Oct. 11, 2016

(54) BELT CONVEYOR WITH A MACHINE HEAD RIB

(71) Applicant: Xia Fengyi, Huainan (CN)

(72) Inventor: Xia Fengyi, Huainan (CN)

( * ) Notice: Subject to any disclaimer, the term of this patent is extended or adjusted under 35 U.S.C. 154(b) by 0 days.

(21) Appl. No.: 14/131,916

(22) PCT Filed: Dec. 27, 2012

(86) PCT No.: PCT/CN2012/001742
§ 371 (c)(1),
(2) Date: Jan. 10, 2014

(87) PCT Pub. No.: WO2013/134907
PCT Pub. Date: Sep. 19, 2013

(65) Prior Publication Data
US 2015/0274426 A1    Oct. 1, 2015

(30) Foreign Application Priority Data
Mar. 11, 2012   (CN) .......................... 2012 1 0070902

(51) Int. Cl.
*B65G 15/00*    (2006.01)
*B65G 15/16*    (2006.01)
*B65G 15/42*    (2006.01)
*B65G 15/08*    (2006.01)

(52) U.S. Cl.
CPC ............... *B65G 15/16* (2013.01); *B65G 15/08* (2013.01); *B65G 15/42* (2013.01)

(58) Field of Classification Search
CPC ...... B65G 15/16; B65G 15/42; B65G 15/56; B65G 15/08; B65G 21/2054; B65G 21/2081
USPC ....................... 198/836.1, 818, 819, 817, 547
See application file for complete search history.

(56) References Cited

U.S. PATENT DOCUMENTS 2,983,362 A * 5/1961 Crist, Jr. ............ B65G 21/2054
                                                    198/547
5,058,749 A * 10/1991 Jong ........................ B07C 5/02
                                                    198/394

FOREIGN PATENT DOCUMENTS

GB          1426275 A  *  2/1976   ......... B65G 21/2054
WO   WO 0078646 A1   * 12/2000   ......... B65G 21/2054

* cited by examiner

*Primary Examiner* — William R Harp
(74) *Attorney, Agent, or Firm* — Hemisphere Law, PLLC

(57) ABSTRACT

A belt conveyor with a machine head rib. At a machine head of the belt conveyor, two annular ribs (1, 2) are sleeved from two sides of an upper supporting roller (5) near the machine head to two sides of a machine head roller (4). A conveying belt (3) is pressed on horizontal edges (1-1, 1-2) and between the two ribs from the upper supporting roller (5) near the machine head to the lowest point of the machine head roller (4) through the machine head roller (4). Protruding vertical sides (1-1, 2-1) of the ribs are higher than the conveying belt. The belt conveyor with a machine head rib has a simple structure, is easy to be installed, has low costs and large conveying capacity and is widely used. In addition to conveying minerals, it can be applied to a belt conveyor with ribs and a trough-type belt conveyor currently.

4 Claims, 2 Drawing Sheets

BELT CONVEYOR WITH A MACHINE HEAD RIB

FIELD OF THE INVENTION

The present invention relates to a belt conveyor, and more particularly to a head wall of the belt conveyor.

BACKGROUND OF THE INVENTION

Typically, a transport belt for a belt conveyor contains a common transport belt (flat belt) and a rib transport belt. The rib transport belt has a rib wall formed thereon so as to enhance operational energy on the belt conveyor. The rib transport belt used for transporting mineral in a high hardness and high quality is produced in high cost, complex process, and it is easily damaged. When common transport belt is applied to transport minerals, a groove angle of a care stick is so small due to a drum head of the belt conveyor is flat, thus limiting transportation usage. To increase transportation capacity, a width of the transport belt is increased.

SUMMARY OF THE INVENTION

The primary object of the present invention is to provide a head wall belt conveyor which operates stably and reliably and is produced at a low cost.

A belt conveyor provided by the present invention contains:

a conveyor head, a body, a tail, and a, transport belt;

the head, two annular ribs belt are fitted on a roller adjacent to the conveyor head and two sides of a drum;

the transport belt is pressed on the roller and two transverse edge via the drum and is defined between two convex vertical edges.

DETAILED DESCRIPTION OF THE PREFERRED EMBODIMENTS

Figure 1:
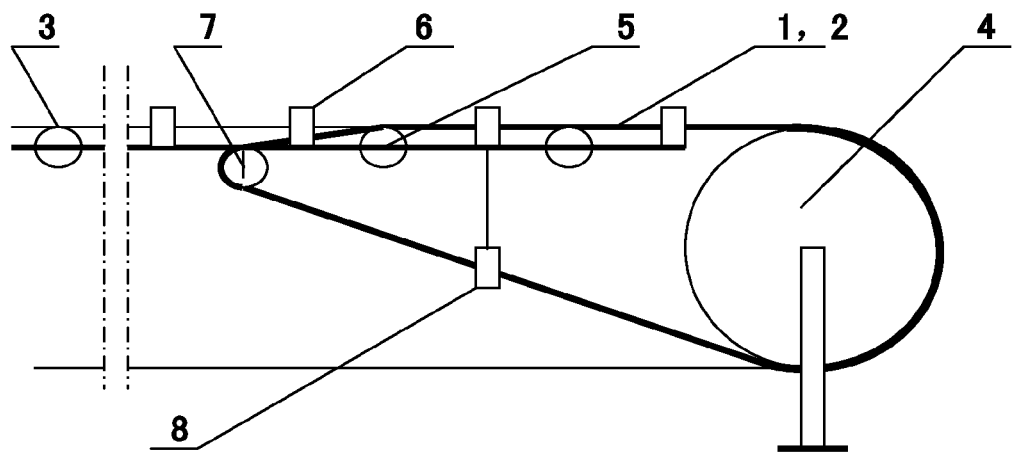
FIG. 1 is a diagram of a nose rib belt conveyor according to a preferred embodiment of the present invention.
Figure 2:
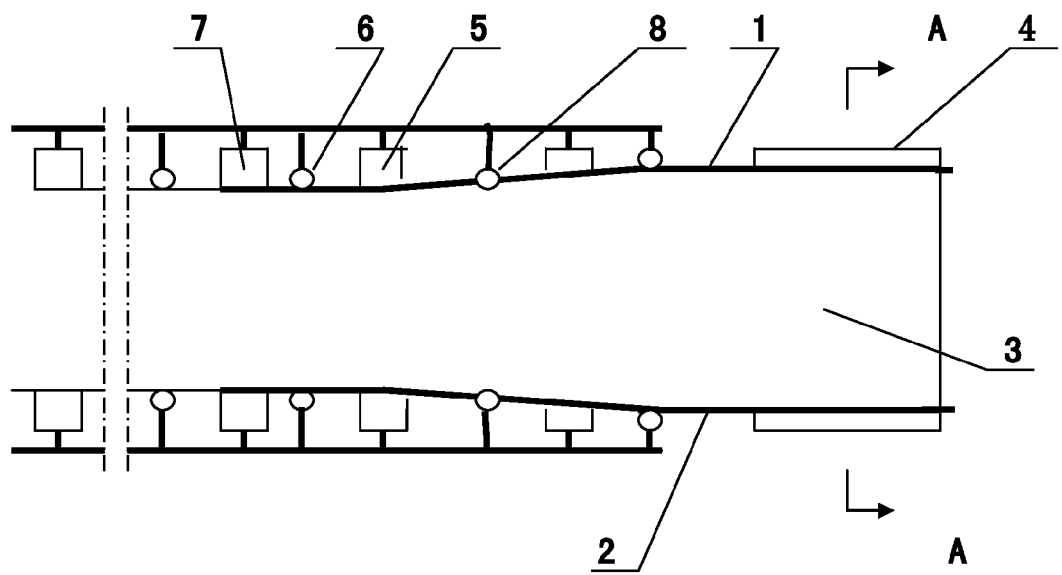
FIG. 2 is a plan view of the nose rib belt conveyor according to the preferred embodiment of the present invention.
Figure 3:
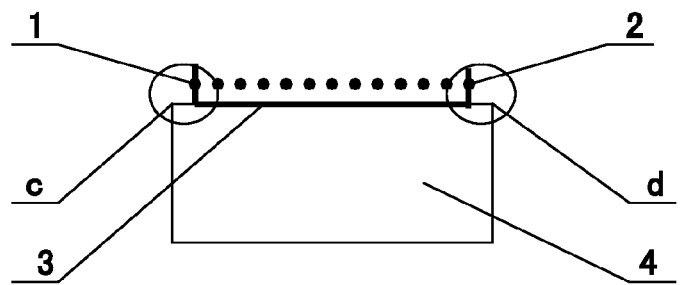
FIG. 3 is a cross sectional view taken along the line A-A of FIG. 2.
Figures 4, 5:
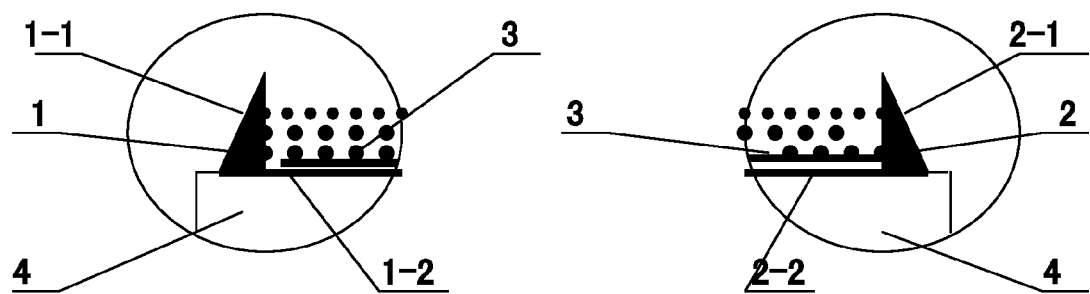
FIG. 4 is an amplified diagram of a point c of FIG. 3.
FIG. 5 is an amplified diagram of a point d of FIG. 3.

When an annular rib belt has a cross section in a L shape, Two annular rib belts 1, 2 are fitted on a guide roller 7 via a roller 5 adjacent to a conveyor head and two sides of a drum 4. Two upper walls 1, 2 are defined on two sides of the roller 5 proximate to the conveyor head. Two transverse edges 1-2, 2-2 are disposed on two sides of the drum 4 proximate to the conveyor head, the transport belt 3 is pressed on the two upper walls 1, 2 and the two transverse edges 1-2, 2-2. Thus, the two upper walls 1, 2 and the two transverse edges 1-2, 2-2 are fixed among a transport belt 3, the drum 4 and the roller 5. The transport belt 3 is defined among the two upper walls 1, 2 and two convex vertical edges 1-1, 2-1. The transport belt 3 is mounted on a connection of the two upper walls 1, 2, two convex vertical edges 1-1, 2-1 and the two transverse edges 1-2, 2-2. Because the two annular rib belts 1, 2 are fitted on the two sides of the drum 4 and the two sides of the roller 5, and the two sides of the drum 4 and the two sides of the roller 5 are not in a vertical plane (i.e., a cross section of the transport belt 3 results from the concave-type transition to the drum). In other words, the two annular rib belts 1, 2, are not in a vertical plane through a guiding roller 8 by adjusting the two upper walls 1, 2, such that it moves close to the transport belt 3 of the roller 5. The two annular rib belts 1, 2 are guided toward the two sides of the roller 5 adjacent to the conveyor head through the guide roller 7. Also, the connection of the two upper walls 1, 2, the two convex vertical edges 1-1, 2-1 and the two transverse edges 1-2, 2-2 are close to the transport belt 3 via a stopping roller 6, such that two lower walls 1, 2 horizontally contact with the transport belt 3. The upper wall 1, the transverse edge 1-2, and the transverse edge 2-2 operate with the drum 4 and the transport belt 3 by using a friction between the drum 4 and the transport belt 3, and the two lower walls 1, 2 operate with the drum 4 and the transport belt 3.

In operation, a power source is conducted, and the two lower walls 1, 2 operate with the drum 4 and the transport belt 3. The two upper walls 1, 2 roll across the drum 4 and the transport belt 3 and separate into the two lower walls 1, 2. The two lower walls 1, 2 are close to the transport belt 3 of the roller 5 by adjusting the guiding roller 8. The lower walls 1, 2 are guided toward the transport belt 3 of the roller 5 through the guide roller 7 by ways of the stopping roller 6 (the two lower walls 1, 2, the convex vertical edge 1-1, the transverse edge 2-2 contact with a lower side of the transport belt 3; the two lower walls 1, 2, the two transverse edges 1-2, 2-2 abut against the transport belt 3), the lower walls 1, 2 are pulled by the upper walls 1, 2 to roll and separate into the two upper walls 1, 2, and the two upper walls 1, 2 and the transport belt 3 are connected together (the two upper walls 1, 2, the two transverse edges 1-2, 2-2 and the lower side of the transport belt 3 are coupled together; a connection of the upper wall 1, the convex vertical edge 1-1, the transverse edge 1-2, the upper wall 2, the convex vertical edge 2-1, and the transverse edge 2-2 connect with the transport belt 3) and then roll. Thereby, the two annular rib belts 1, 2 roll with the transport belt and the drum 4. When material is transported to the roller 5 with the transport belt 3, the transport belt 3 becomes straight so that the material becomes concave. Since the two convex vertical edges 1-1, 2-1 contact with the transport belt 3, and the material becomes concave and is stopped by the two convex vertical edges 1-1, 2-1 and is delivered to the drum 4 with the transport belt 3 so as to move to next transport belt or a store house.

The two annular rib belts 1, 2 and the two convex vertical edges 1-1, 2-1 contact and operate with the lower side of the transport belt 3, such that the material cannot enter into the two upper walls 1, 2 and the transport belt 3 to damage the transport belt 3. When a transport quantity of the material is increased, transportation efficiency is enhanced. Furthermore, the material does not spread, thus improving conveyor head.

When the two annular rib belts 1, 2 and the two transverse edges 1-2, 2-2 are connected together, the annular rib belt with the two convex vertical edges 1-1, 2-1 is produced.

In the meantime, the annular rib belt with the two convex vertical edges 1-1, 2-1 is fitted on the roller 5 and the drum 4 of a belt conveyor with a machine head rib.

Or the annular rib belt with the two convex vertical edges 1-1, 2-1 is fitted on the guide roller 7 though the roller 5 and the drum 4.

The guide roller 7 has two tanks so that two annular rib belts 1, 2 passes two tanks of the guide roller 7. And, when the two annular rib belts 1, 2 and the two transverse edges 1-2, 2-2 are connected together, the annular rib belt with the two convex vertical edges 1-1, 2-1 passes a tank of the guide roller 7.

The drum 4 includes two grooves so that two annular rib belts 1, 2 pass through the two grooves of the drum 4; or the drum 4 includes a groove so that an annular rib belt with the two convex vertical edges 1-1, 2-1 passes through the groove of the drum 4.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A belt conveyor comprising:
    a conveyor head, a body, a tail, and a transport belt (3);
    wherein on the conveyor head, two annular rib belts (1, 2) along two sides of the transport belt (3) are fitted on a roller (5) adjacent to the conveyor head and two sides of a drum (4)
    wherein the transport belt (3) is pressed on the roller (5) and two transverse edge (1-2, 2-2) via the drum (4) and is defined between two convex vertical edges (1-1, 2-1);
    wherein the two annular rib belts (1, 2) connect with the two transverse edges (1-2, 2-2).

2. The belt conveyor as claimed in claim 1, wherein the two annular rib belts (1, 2) are fitted on a guide roller (7) via the roller (5) adjacent to the conveyor head and two sides of the drum (4).

3. The belt conveyor as claimed in claim 1, wherein the drum (4) includes two grooves so that the two annular rib belts (1, 2) pass through the two grooves of the drum (4); or the drum (4) includes a groove so that an annular rib belt with the two convex vertical edges (1-1, 2-1) passes through the groove of the drum (4).

4. The belt conveyor as claimed in claim 1, wherein between the drum (4) and the roller (5) is fixed a guiding roller (8); the guiding roller (8) is provided to contact the two annular rib belts (1, 2) with the transport belt.

\* \* \* \* \*